United States Patent [19]

Fukahori et al.

[11] 4,306,794

[45] Dec. 22, 1981

[54] CAMERA AND POWER DRIVE WITH AUTOMATIC REWIND BRAKE

[75] Inventors: Hidehiko Fukahori, Kawasaki; Tomonori Iwashita, Fuchu; Yukio Mashimo, Tokyo, all of Japan

[73] Assignee: Canon Kabushiki Kaisha, Tokyo, Japan

[21] Appl. No.: 48,741

[22] Filed: Jun. 15, 1979

[30] Foreign Application Priority Data

Jun. 16, 1978 [JP] Japan ............................... 53-73039
Jul. 18, 1978 [JP] Japan ............................... 53-87330

[51] Int. Cl.³ ........................... G03B 1/12; G03B 1/18
[52] U.S. Cl. .................................. 354/173; 352/124; 354/214
[58] Field of Search ............... 354/214, 173; 352/124, 352/129; 242/186, 200

[56] References Cited

U.S. PATENT DOCUMENTS

| 1,210,955 | 1/1917 | Langcheck | 352/124 |
| 3,004,729 | 10/1961 | Barkhuff | 242/200 |
| 3,994,003 | 11/1976 | Iwashita et al. | 354/173 |
| 4,171,893 | 10/1979 | Kawazoe | 354/214 |

FOREIGN PATENT DOCUMENTS 998468 7/1965 United Kingdom ............... 242/186

*Primary Examiner*—B. Dobeck
*Assistant Examiner*—Shelley Wade
*Attorney, Agent, or Firm*—Toren, McGeady and Stanger

[57] ABSTRACT

In the disclosed camera and power winder arrangement, a power winder winds the film and contains a rewinder. A detector responds to rewinding movement of the film past a predetermined position, and a control circuit responds to the detector's sensing that the film has stopped moving past the predetermined position by braking the film rewind source.

18 Claims, 15 Drawing Figures

CAMERA AND POWER DRIVE WITH AUTOMATIC REWIND BRAKE

BACKGROUND OF THE INVENTION

This invention relates to cameras, and particularly, to camera film rewinders having stopping devices capable of automatically sensing when the film has been rewound and automatically stopping the rewind operation.

After the photographic film in a camera has been exposed, that is, after exposure of all the frames has been completed, it is necessary to rewind the film. If a photographer is attempting to take pictures rapidly, the rewinding operation of the exposed film is quite troublesome and time consuming. When a continuous succession of exposures at a high frame frequency is desired, rewinding often results in missing an opportunity for a good picture. Also, it is often necessary to adjust the amount of film rewound to prevent the film leader from being drawn into the film cartridge, and hence, introducing difficulties in subsequent procedures such as automatic development.

A wide variety of automatic rewinders, such as the types with electric motor drives has been introduced to speed the rewinding process. Such devices generally lack the means for accurately adjusting the amount of film rewound. This creates the problem of unintentionally drawing the film leader into the cartridge.

Proposals have been made to provide cameras having a rewind drive, with a detector adjacent to the film plane to detect whether the film is present or absent. When the film is being rewound, the rewinding operation can be automatically stopped by a signal from such a detector. However, where the power drive unit is separate from the camera body, such devices require a signal transmission channel between the camera and the unit. This produces a number of other problems. When the detecting member contacts the film surface, it may scratch the film, particularly because the film is first advanced and then reversed. It may also impede the normal film advance. Also, a detecting member positioned inside the camera housing may complicate the camera structure and increase its bulk and size.

Another proposal involves utilizing the film counter for stopping the film rewinding operation. However, the film counter must usually be set manually to take into account the number of frames available. If the cartridge has been used, the number of available frames may not be indicative of the total frames on the film. The operator may also set the counter incorrectly or fail to set the counter at all. All of these may result in rolling in the film leader or ending the rewinding operation too soon. If the latter occurs, the operator may open the back of the camera while film is not rewound and ruin pictures of never-recurring scenes.

Many types of motor driven film rewinders are known in the art. Any one of them when set in the rewind mode may produce one of the aforementioned or other drawbacks. Of such rewind devices, there is one in which a rewind shaft rises to engage the cassette takeup spool through a coupler and start rewinding only when the rewind mode is selected. In another device, the rewind shaft is permitted to engage the cartridge spool when the film has been wound and drives the spool only in the rewind mode. However, these devices have a number of disadvantages. In the first of these devices, the rewind torque transmission system is established manually when the rewind mode is selected and the driving engagement of the rewind shaft with the spool is essentially unstable. Hence, the rewind operation is unreliable. Also, a substantial force is necessary to switch into the rewind mode. On the other hand, the second of these two devices always sets the rewind torque transmission system into the active state, and hence, subjects the film winding operation to an unnecessary load. This results in loss of electrical energy in the battery. It also slows transport of the film in the forward direction and even in the reverse direction.

To avoid such drawbacks, proposals have been made to displace the rewind shaft to engage the cartridge spool when switching to the rewind mode by using the driving force of the motor. This appears in Japanese utility model application Sho 46-81782, Japanese utility model Sho 52-23010. According to this proposal, the rewind shaft is brought into engagement with the spool hub and the drive does not start to rewind until after engagement is established. Hence, the load of the winding system in the camera housing and the inertia of the rewinding mechanism are suddenly applied when the rewinding operation is initiated. This results in a ramping effect which requires extra time. This makes it difficult to shorten the rewinding operation.

There are a number of photographic situations where rapid automatic film rewinding is essential. For example, where a continuous succession of exposures happens to be interrupted by the lack of additional frames in the cartridge, a photographer must replace the film with a new cartridge as soon as possible. In other words, where the photographer's assignment requires a motor driven operation spanning at least two film strips, the operator requires the shortest time possible between strips, and hence, fast replacement of the film cartridge. The extent to which the rewind time is reduced is essentially a great factor in determining whether or not automatic rewind is valuable.

The film rewind operation is associated with reverse movement of the film takeup spool and its drive shaft. A frictional coupling exists between the takeup spool and the drive shaft. During rewind, this frictional force applies a large load on the drive source, for example, the electric motor. The electric motor itself is another factor in speeding up the film rewinding operation. However, a high torque electric motor is unsuitable for use in an instrument of small bulk and size such as a camera, both from the viewpoint of electrical energy consumption and space. This automatically limits the speed of the film transport in the rewind mode.

The aforementioned proposals have another disadvantage. Because it is necessary to engage the spool hub with the rewind shaft before starting the rewinding operation, the start of movement of the spool is retarded by the inertia of the rewinding mechanism to such an extent that it hampers the much desired increase in the rewind speed. This makes it impossible to obtain a satisfactory rapid rewind device. Also, on a practical basis, it is necessary to provide a spring biased rewind coupling between the drive shaft and the spool hub so that driving engagement can be established by pushing down and then permitting return. When the rewind drive shaft starts to rotate from its stationary position, it applies a sudden large load on the connection between the rewind coupler and the spool hub. This requires a large effective connection area to prevent slippage. However, an increased connection area increases the amount of displacement of the coupler and the height of the rewind device. This results in a disadvantageous sacrifice in compactness.

An object of the invention is to provide an improved camera with a film rewind device.

Another object of the invention is to eliminate the aforementioned drawbacks.

SUMMARY OF THE INVENTION

According to a feature of the invention, when the film is being rewound, means detect the operation of a rotary member rotating in engagement with the film to stop the rewind operation.

According to another feature of the invention, the rotary member is in the form of a camera sprocket which engages the film perforations, or, where the film has no perforations, a film feed roller in the film footage control mechanism, or the takeup spool in the film winding mechanism. Since the film is left engaged with the member as the film is wound back to the supply spool, the rotary member rotates until the film disengages therefrom. At this time, the speed of the rotary member drops to zero. Means detect this cut off of driving torque from the film.

These and other features of the invention are pointed out in the claims, forming a portion of this specification. Other objects and advantages of the invention will become evident from the following detailed description, when read in light of the accompanying drawings.

DETAILED DESCRIPTION OF PREFERRED EMBODIMENTS

Figure 1:
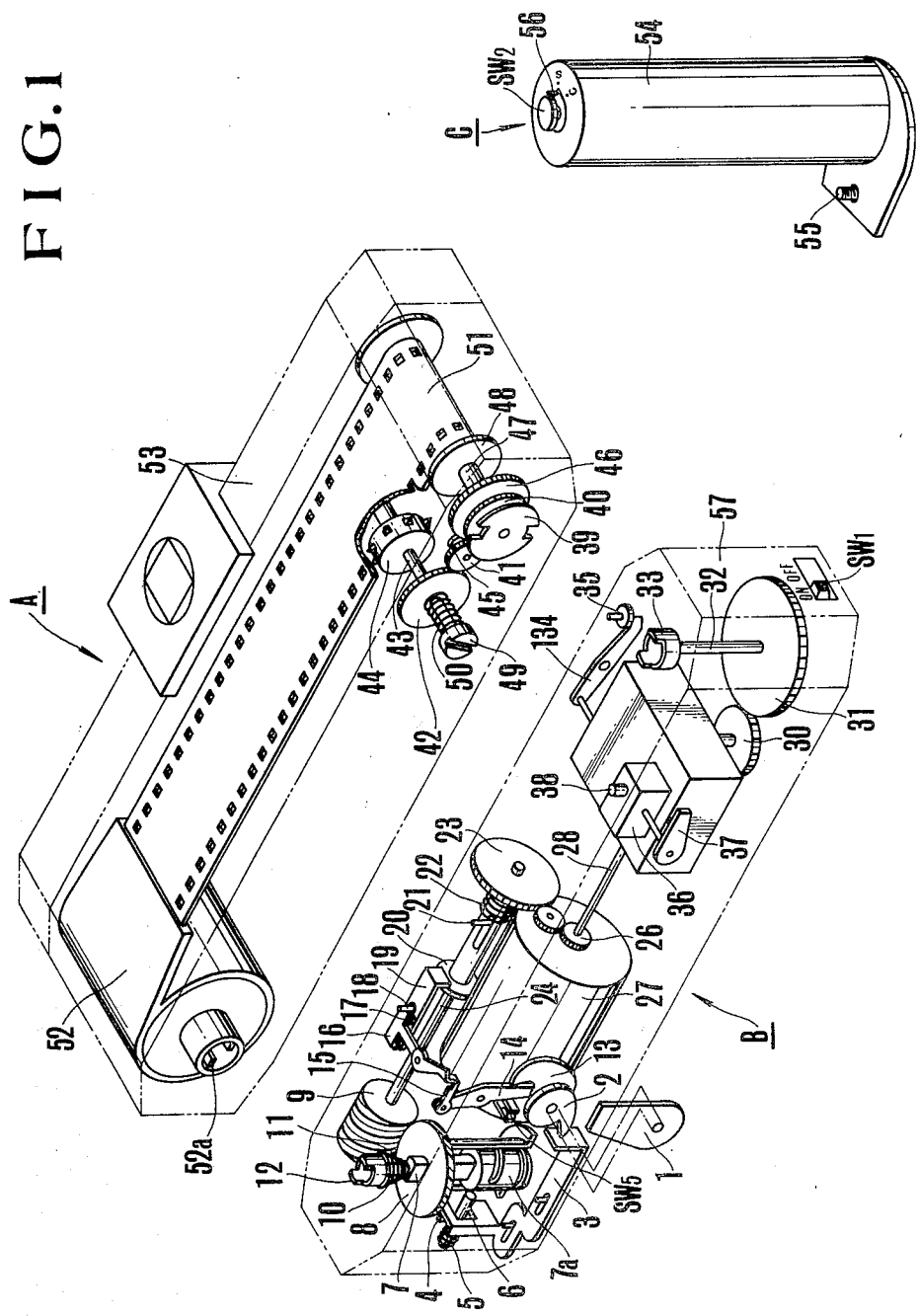
FIG. 1 is an exploded perspective view of one embodiment of the present invention, and particularly, showing a camera body, a motor drive unit, and a grip containing a motor driven film winding device.

In FIG. 1, a camera body A has a bottom surface to which a film-winding, film-rewinding, and shutter-cocking, motor-driven, power winder (or power winding unit, or power winding device) B is removably attachable. Suitable screw fasteners make a grip C attachable to the power winder B on one side panel. An electrical power source or battery in the grip C serves to energize the winding device. Details of each of the sections A, B, and C follow.

(1) The power winder B

Figure 2:
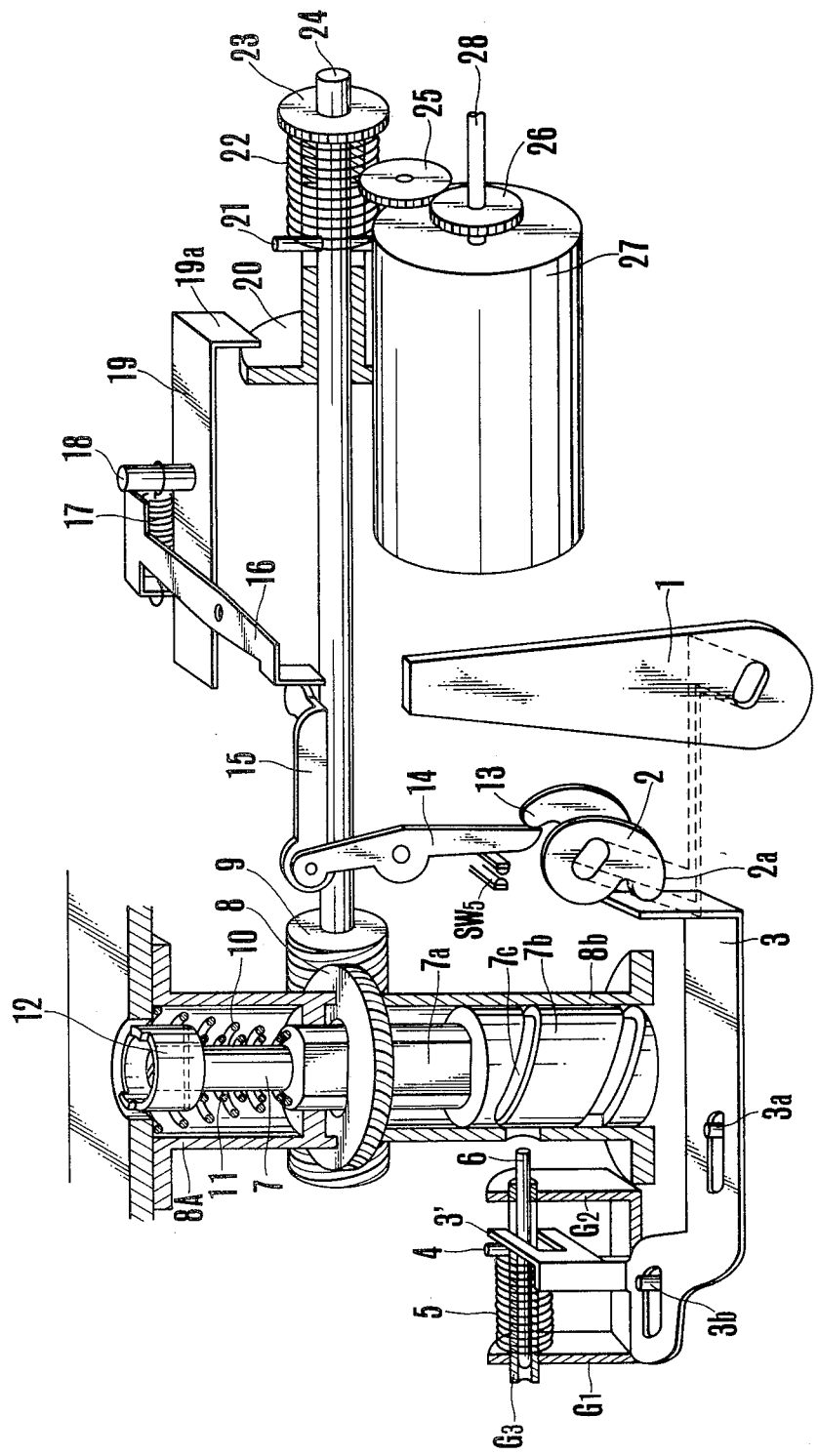
FIG. 2 is a partly sectional perspective elevational view of the main parts of a motor driven rewind device incorporating the motor driven winding unit of FIG. 1.

In FIG. 1, a rewind mode selector level 1 is pivotally mounted on a rear wall of a power winder casing, generally shown in dot-dash lines. A cam disc 2 is mounted so as to turn with the lever 1. A slide plate 3 moves linearly along a path determined by guide pins 3a and 3b mounted on the frame of the casing and extending into the elongated slots in the slide plate 3, as shown in FIG. 2. A bent portion 3b engages a projection 2a of the cam disc 2. A forked arm 3' projecting from the slide plate 3 engages a pin 4 biased to the right by a spring 5. The pin 4 extends radially from the pin 6 through and beyond a key groove of a guide sleeve G3 supported by guide plates G1 and G2 (FIG. 2) which are mounted on the frame. The spring 5 is positioned between the pin 4 and the guide plate G1, and hence, urges the pin 4 against the forked arm 3' of the slide plate 3. Hence, the forked arm 3' limits the operation of the detent pin 6 from which the pin 4 radially extends.

A rewind shaft 7 includes an upper top circular portion, a midportion 7a having two flat key surfaces and a lower portion 7b forming a spiral groove 7c. A gear 8 contains an elongated central cut out portion to engage the key surfaces of the midportion 7a so that while the shaft 7 slides vertically, relative to the gear 8, the latter can apply rotary motion to the shaft 7. The gear 8 is sandwiched for rotatable support between a sleeve 8a affixed to the upper frame of the casing and another sleeve 8b affixed to the lower frame of the casing. A worm gear 9 engages the gear 8 to apply rotary motion thereto.

A spiral spring 10 which continuously biases the rewind shaft 7 downwardly is compressed between the casing frame and a stepped shoulder of the midportion 7a of the shaft 7. A spring 11 compressed between the shoulder of the midportion 7a and a rewind coupler 12 urges the coupler 12 in the upward direction. The coupler 12 is retained at the top end of the shaft by a fastener engaging a screw-threaded flange. Downward movement of the coupler 12 is permitted, but limited by a pin radially extending from the top portion of the shaft 7. The coupler 12 and shaft 7 are of the type disclosed in U.S. Pat. Nos. 3,898,679 and 3,994,003.

A second cam disc 13 mounted on the shaft to move with disc 2 has a circumferential edge which engages a selector lever 14, which is pivotally mounted to the housing or casing or frame. A swing lever 15 is pivotally linked to the top end of the lever 14 and engages the downwardly bent portion at one end of an intermediate lever 16 which is pivoted at its center. A tension spring 17 engages an end post of the intermediate lever 16 to draw a pin 18 extending from a slide 19 which is arranged to slide horizontally. An end portion 19a of the slide 19 engages a collar shaft 20. The force of the spring 17 placed in tension between the pin 18 on the slide 19, and the end post of the lever 16 causes the bent portion 19a always to engage the collar shaft 20. A pin 21 rides in a linear key groove of the collar shaft 20. Biasing the collar shaft 20 to the right is a spring 22, which is compressed between the pin 21 and a driven gear 23 which rotates a shaft 24. The pin 21 is mounted on the shaft 24 and engages the linear key groove of the collar shaft 20 so that the collar shaft 20 and the shaft 24 rotate in unison in response to rotation of the gear 23. The gear 23 is driven when it is moved in the axial direction into engagement with a mid gear 25. The latter lateral movement and engagement with the mid gear 25 occur when the rewind mode is selected. In that condition, the gear 23 receives rotary drive torque from the mid gear 25 which engages a drive gear 26 that transmits the output of a motor 27 through a drive shaft 28.

Figure 4:
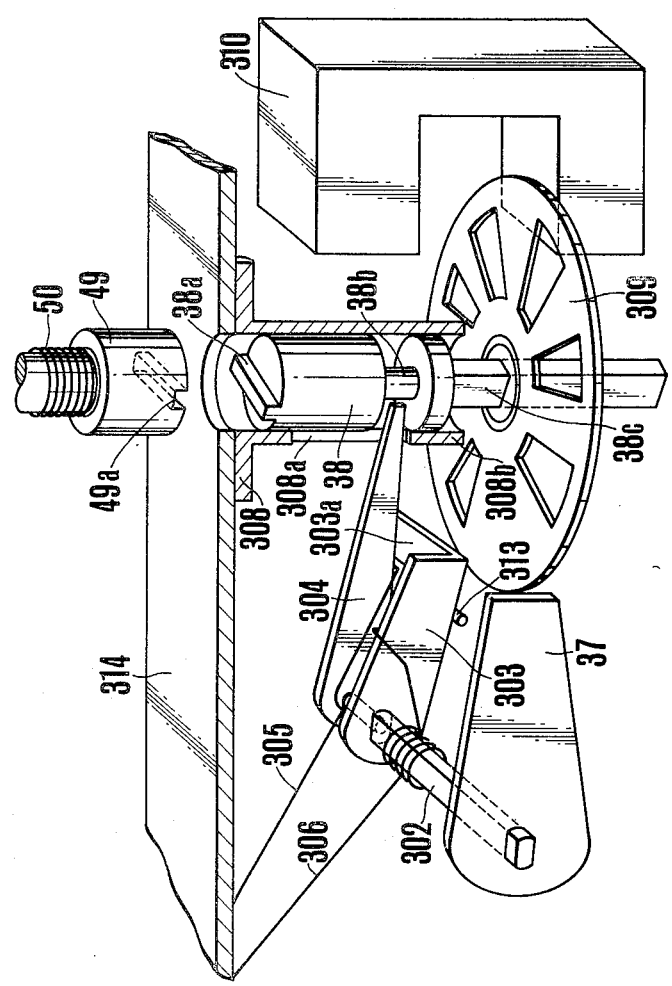
FIG. 4 is a perspective view of a film rewind detecting mechanism incorporated in the motor driven winding unit of FIG. 1.
Figure 5:
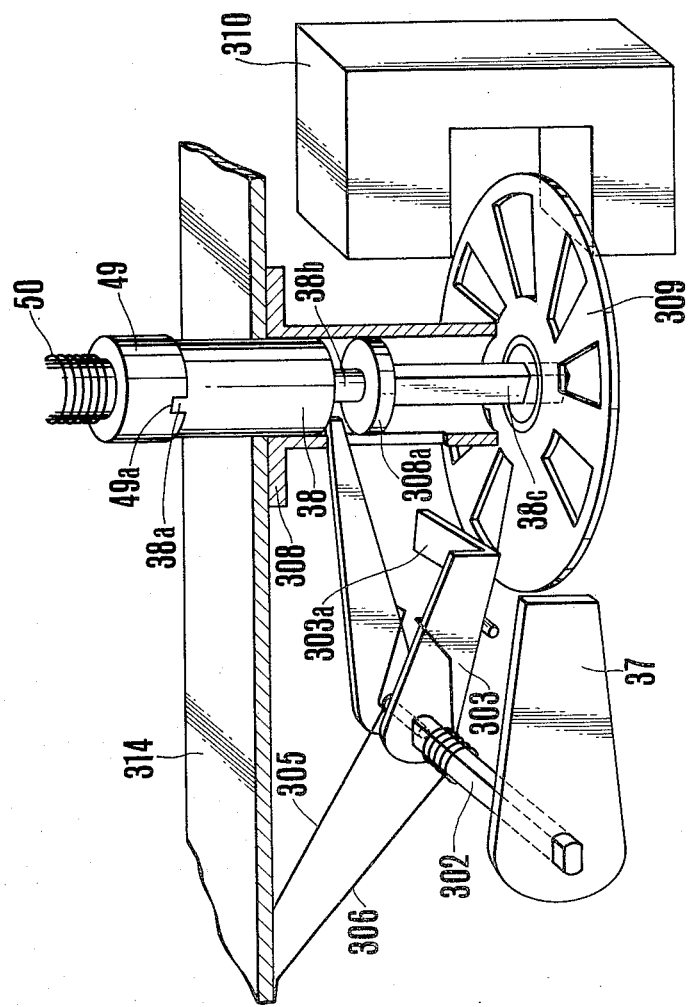
FIG. 5 is a view of the mechanism in FIG. 4 in the rewind mode.

In the winding mode, a known speed reduction mechanism 29 reduces the speed of the drive shaft 28 and rotates an output gear 30. A gear 31 engaging the gear 30 turns a drive shaft of a coupler for engaging a takeup spool within the camera housing. A detector unit 36 responds to clockwise movement of a rewind lever 37 pivotally movable on the rear wall of the housing to project a release pin 38 and engage it with a rewind button in the camera housing. Details of the detector unit 36 are shown in FIGS. 4 and 5, and are described at a later portion of this specification.

(2) The camera body A (FIG. 1)

The power winder B is attachable to the camera body A at the bottom panel of the camera housing. A windup coupler 39, whose details are well known, and hence, omitted appears at an opening in the camera body bottom. When the power winder B is attached to the camera body, recesses in the coupler 39 engage the winding coupler 33 of the power winder B. A gear 40 turns with the coupler 39 through a common shaft. An intermediate gear 41 drives a gear 42 on a shaft 43, carrying a sprocket wheel 44. An intermediate gear 45 turning on a common shaft with the gear 41 meshes with a gear 46 secured to a shaft 47 of a takeup spool 48. As conventional, the spool 48 is frictionally arranged on the drive shaft 47 for frictional torque transmission. A rewind button 49 mounted at the end of the sprocket shaft 43 displaces the shaft 43 against the force of a spring 50 when pressed upwardly. When so pressed, a clutch, not shown, between the sprocket 44 and the shaft 43 is disengaged. This permits the sprocket 44 to rotate freely. On the other hand, the gear 42 is not displaced at this time and remains engaged with the gear 41.

The part of the sprocket shaft 43 holding the gear 42 is flattened at two sides and extends to the button 49. A fitted hole of the gear 42 is configured to the cross-section of the flattened part of the shaft 43. Hence, the torque of the gear 42 is transmitted to the shaft 43. Therefore, the rewind button, when in the wind or rewind mode, is rotated in opposition directions. Spool control devices of this type are disclosed in U.S. Pat. No. 4,135,801 and hence known.

A film 51 emerges from a cartridge 52 whose core contains a coupler 52a engageable with the pawl of the rewind coupler 12 when the power drive B is attached to the camera body A. For this purpose, the bottom panel of the camera housing is provided with a hole in alignment with the core of the spool. Although this hole is normally covered by a light-shielding member, the latter is removed when the power drive B is attached to the camera body A to permit insertion of the coupler 12 into the hole. There, the coupler 12 engages the hub 52a of the supply spool in the cassette 52. Such a coupling mechanism may be constructed as disclosed in Japanese Utility Model Sho 50-137626 (Japanese Published Utility Model Sho 52-50729).

(3) The grip C

In the grip C, the top of a cylindrical housing 54 carries a release switch SW2 and an exposure selector member 56. Within the housing 54, is an electrical power source or battery P. The bottom panel of the grip housing is dimensioned to extend under the bottom panel of the power drive B to be fixedly secured thereto by a screw fastener 55. The power source P and the switch SW2 are provided with respective connectors (not shown) in FIG. 1. When the selector member 56 is turned to an index "C", it selects the continuous exposure mode. When turned to the letter "S", it selects the single frame exposure mode.

(4) The detector unit 36 and control circuit

Details of the detector unit 36 appear in FIGS. 4 and 5. Here, a shaft 302 keyed to the rewind lever 37 along two flat faces fit into a keyed hole of a lever 303. A lever 304 with a round hole is rotatable about the rotary shaft 302. A spring 305 biases the lever 304 into normally abutting engagement with the front end of the lever 303. A spring 306 touching the upper frame of the housing urges the lever 303 against a stopper pin 313.

The free end of the lever 304 engages the lower stepped down portion 38b of the release pin 38, and upon pivotal movement shifts the release pin 38 up and down. The upper end of the release pin 38 is provided with a protuberance 38a and the lower portion forms a flattened shaft 38c on which a rotary circular detection plate 309 is movably mounted. The plate 309 is composed of an opaque material having a number of equally spaced slits.

A photo-coupler unit straddles the detecting plate 309 and includes a light source and a light detecting element on opposite sides of the detecting plate (or disc) 309.

A sleeve 308 fixed to the upper frame of the casing carries the release pin 38 for axial movement therein. The front end of the lever 304 projects through a linear slot 308a cut in the sleeve 308 to engage the release pin 38. In the rewind mode when the rewind lever 37 is turned counterclockwise from the position shown, the lever 304 is lifted by the lever 303 and the release pin 38 is moved upwardly by the top of the lever 304. The pin 308 then engages a rewind pin 49 in the camera. At this time, the axial displacement of the detection plate 39 is prevented by the end surface of the sleeve 308.

As will be described, the rewind pin 38 is latched in the set position. When the operator releases the lever 37, the spring 306 returns the lever 303 to the position shown in FIG. 5. On the other hand, the spring 305 holds the lever 304 upwardly and sets the release pin in the rewind position. At this time, the camera is ready for rewinding and the sprocket is freely rotatable.

Figure 6:
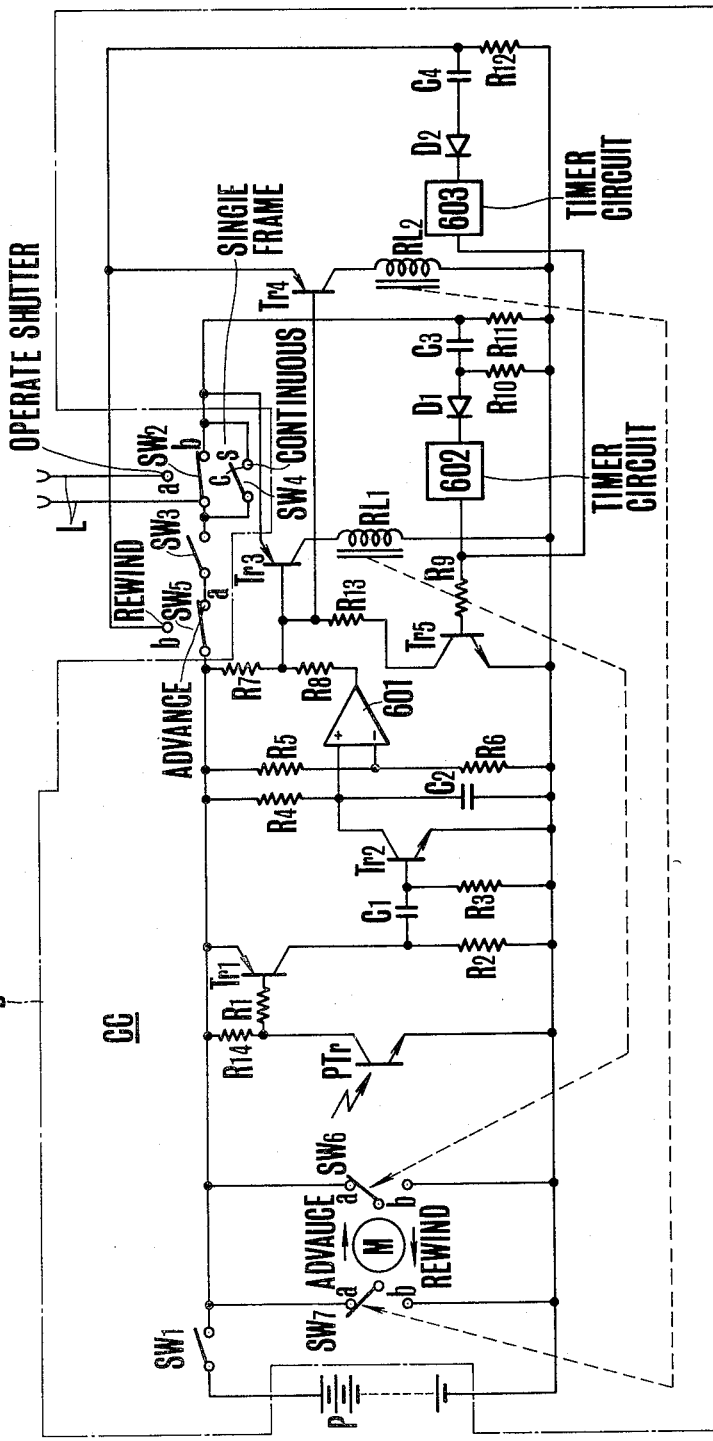
FIG. 6 is an electrical circuit diagram of the various portions shown in FIG. 1.

The power drive B contains the electrical control circuit CC shown in FIG. 6. Power for the control circuit CC comes from the power source or battery P in the grip C. A power switch SW1 mounted on the side wall of the housing of the power drive B is manually actuable for energizing and deenergizing the circuit CC. In the circuit CC, a pair of selector relay contacts or switches SW6 and SW7 of two relays RL1 and RL2 respond to the relay coils (also identified as RL1 and RL2) to drive a motor M in the forward direction or in the reverse direction, or to short-circuit the motor. A photo-transistor PTr forming part of the photo-coupler unit 310 of FIGS. 4 and 5 and responsive to passage of light at the circular plate 309, renders a transistor Tr1 conductive through a collector resistor R14 and a base resistor R1, in response to light striking the photo-transistor. A collector resistor R2 for the PNP transistor Tr1 forms an input to a differentiating circuit composed of a capacitor C1 and a resistor R3 and connected across the resistor R2, which differentiates the signal and applies it to a transistor Tr2. A collector resistor R4 and a capacitor C2 form a timing circuit with the output of the transistor Tr2. A comparator 601 compares the output of the timing circuit R4, C2 at its positive input with a voltage established by a voltage divider composed of resistors R5 and R6 and applied to its negative input. The output of the comparator 601 appears at the common junction of a voltage divider composed of resistors R7 and R8.

The output of the comparator 601 is utilized in dependence upon the operation of four switches SW2, SW3, SW4 and SW5, which respond to various mechanical operations of the camera. The switch SW5 has a movable contact which is normally set to the position a by the lever 14 of FIGS. 1 and 2, but is set to the position b when the rewind lever is operated. The switch SW3 is turned on in response to operation of or release of the shutter and turned off when the film has been wound for one frame. The switch SW3 may be arranged to cooperate with the shutter mechanism of the camera as disclosed in Japanese Published Patent Sho 52-62015. Such operation of switch SW3 is also shown as switch SW5 in U.S. patent application, Ser. No. 868,862, filed Jan. 12, 1978 (continuation of Ser. No. 741,727, filed Nov. 15, 1976), whose claims have been allowed. The switch SW2 in the grip C is normally set to the position "a" when the mode selector member 56 selects the continuous exposure mode and switched to the position "b" when the single frame exposure mode is selected. Similarly, the switch SW4 is turned on in response to the mode selector member 56 of the grip C selecting the continuous exposure mode and turned off when the single frame exposure mode is selected. The switches SW2 to SW5 are outside the power drive B and suitable connectors, not shown in FIGS. 1 to 5, are needed to connect them from the camera body A to the grip C, to the power drive B.

Two PNP transistors Tr3 and Tr4 have respective bases connected to the junction of resistors R7 and R8, at the output of comparator 601, and when energized by the switches SW2 to SW5, energize the coils of respective relays RL1 and RL2. A timer circuit 602, in the form of a one-shot circuit, receives an input through a differentiating circuit composed of resistors R10 and R11, capacitor C3 and diode D1. The timer circuit 602 is initiated by the switch SW3 upon shutter release. A second timer circuit 603 receives a differentiated signal through a differentiator composed of capacitor C4, resistor R12 and diode D2. The timing here is initiated by the switch SW5 moving to the position "b" in response to setting of the rewind operation.

Both timer circuits 602 and 603 serve to turn on a transistor Tr5 through a resistor R9. A resistor R13 applies the output of the transistor Tr5 to the bases of PNP transistors Tr3 and Tr4. Since the latter transistors control the relays RL1 and RL2, which in turn operate the motor M, the timer circuit 602 forms a delay between actuation of the film drive in the winding mode, and the time at which the film actually is driven. The timing period of the timer 603 starts from actuation of the film rewind circuit and the moment the film is actually driven, and the capacitor C2 is discharged by turning the photo-transistor PTr on and off.

The time constant of the timer R4, C2 is adjusted to be longer than the time during which the capacitor C2 is discharged by conduction of the transistor Tr2 in response to the differentiating circuit when the photo-transistor PTr is turned on and off as the circular plate 309 rotates during the winding or rewind operation.

(4) Operation: Single Frame Exposure Mode

In operation, the operator mounts the power drive B and the grip C on the body A which includes a suitable lens. The operator moves the mode selector member 56 of the grip C to the position "S" (single frame) and moves the lever 1 to the advance position. Mounting the power drive B on the camera body A engages the coupler 39 with the pin 38.

At this point, the switches SW2 and SW7 assume the positions shown in FIG. 6. That is, the power switch SW1 on the body A is off and the shutter release switch SW2, on the grip C is normally biased to the contact "b". The switch SW3, as previously stated, responds to the previous film advance by opening as shown. The switch SW4 responds to the setting of the selector member 56 to the single frame position "S" by opening, the switch SW5 is placed in the film advance position "a" by the lever 1 moving the lever 14, and the switches SW6 and SW7 assume the positions shown by virtue of the relays RL1 and RL2 being energized. In the latter position, the switches SW6 and SW7 short-circuit the motor M and keep it in one position.

Figure 7:
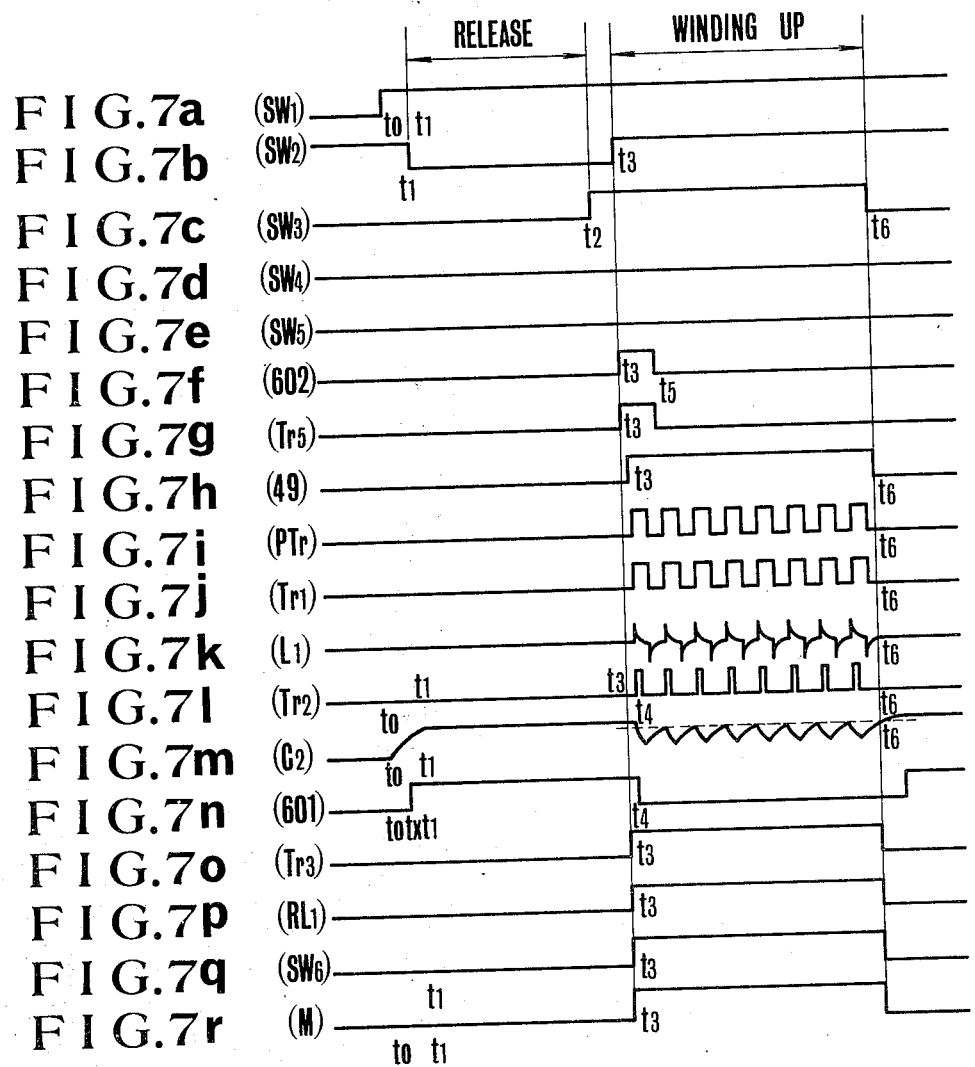
FIGS. 7a to 7r illustrate various electrical signals occuring in the circuitry of FIG. 6, when operated in the single frame exposure mode.

When at the time $t_0$ in FIG. 7a, the operator turns on the power switch SW1 to energize the system, the capacitor C2 charges as shown in FIG. 7m until it passes a threshold and raises the output of comparator 601, as shown in FIG. 7n. The operator now points the lens and depresses the release switch SW2 to take a picture. This moves the movable contact of switch SW2 to "a" (at the time $t_1$ in FIG. 7b) and closes a circuit that effectively sends a release signal to the camera body A through lines L. In the camera body, the release signal, i.e., closing of the contact a in the switch SW2, actuates an electromagnetic release device (not shown) which operates a mirror, diaphragm, and shutter in sequence. After the exposure is completed, the shutter is closed and the exposure operation terminated.

Switch SW3, as previously stated, responds to completion of the exposure operation at the time $t_2$ in FIG. 7c by turning on. The voltage from the source P now appears at the switch SW2. Upon removal of the operator's finger from the switch SW2 at the time $t_3$ in FIG. 7b, the removal contact is biased back to the position "b". This applies a voltage step to the differential circuit R11, C3, R10 and the diode D1, and a pulse to the timer circuit 602. The one-shot circuit in the timer circuit 602, is now (time $t_3$ of FIG. 7f) set, and the transistors Tr3 and Tr5 are turned on to energize the relay RL1. The relay RL1 moves the switch SW6 from "a" to "b" and the motor M is supplied with current through a circuit which can be traced as P-SW1-SW7a-SW6b-P.

The motor M is therefore driven in the forward direction. Motion of the energized motor is transmitted through the speed reduction mechanism 29, gears 30 and 31, and the winding couplers 33 and 39 to the takeup spool. Thus, the film is advanced one frame and the shutter cocked.

During this time, the sprocket 44 is also driven, and rotation of the rewind pin 49 (FIG. 7h) is transmitted to the release pin 38. The circular detection plate 309 thus rotates and intermittently exposes the photo-transistor PTr to the light so as to produce the pulses shown in FIG. 7i.

The intermittently operating transistor PTr turns the transistor TR1 on and off in synchronism therewith as shown in FIG. 7j (time $t_3$, etc.). The differentiator R2, C1, R3 then differentiates the pulses to produce the signal shown in FIG. 7k. The transistor Tr2 which responds to the positive going signals from the differentiator produces the pulses of FIG. 7l. During each pulse, conduction of the transistor Tr2 momentarily discharges the capacitor C2 as shown in FIG. 7m.

The initial pulse of the transistor Tr2 at the time $t_4$ discharges the capacitor C2 to a sufficiently low level to drive the comparator circuit 601 down as shown in FIG. 7n. Because the transistor Tr2 discharges the capacitor C2 at a sufficiently high repetition rate beyond a predetermined level, during the pulse repetitions, the capacitor C2 does not have the chance to recharge to the threshold level necessary for raising the output of the comparator circuit 601. Hence, the continued pulses keep the output of the comparator circuit 601 low as shown in FIGS. 7m and 7n. This holds or latches the transistor Tr3 in the conductive state as shown in FIG. 7c.

The timer circuit 602 is reset by its internal time constant at the time $t_5$ just after the film 51 starts to move. The biases the transistor Tr5 off and attempts to turn off the transistor Tr3. However, the operation of the relay 1 is maintained by the output of comparator circuit 601 holding the transistor Tr3 on (See FIG. 7o), so that the winding operation or film advance continues.

In this embodiment, the total number of slits in the circular detection plate 309 is eight and the plate rotates one revolution for each frame of film advance. Hence, the photo-transistor PT4 produces eight intermittent signals as shown in FIG. 7i. When one cycle of the film winding and shutter cocking operation has been completed at time $t_6$, the switch SW3 is opened to deenergize the relay RL. This returns the switch SW6 to the "a" position and short-circuits the motor winding to brake the motor to a stop. The camera is now ready for the next exposure.

(5) Continuous Exposure Mode

Setting the selector member 56 to the "C" position, closes the switch SW4 and selects the continuous exposure mode. The switches SW2, SW3, and SW5 to SW7 are in the positions shown in FIG. 6. The power switch SW1 is closed. When the shutter release switch SW2 is depressed, an exposure and winding operation is performed, as in the above-described single frame exposure mode. However, because the shutter release switch SW2 continues to be depressed and the switch SW2 remains in the position "a", and the switch SW4 remains at "C", each time the switch SW3 is opened at the completion of winding or film advance operation, another shutter release is actuated. After actuation of each release, when one frame has been exposed, the switch SW3 is closed, causing the motor M to rotate forward, to advance the film and reopen switch SW3.

Figure 8:
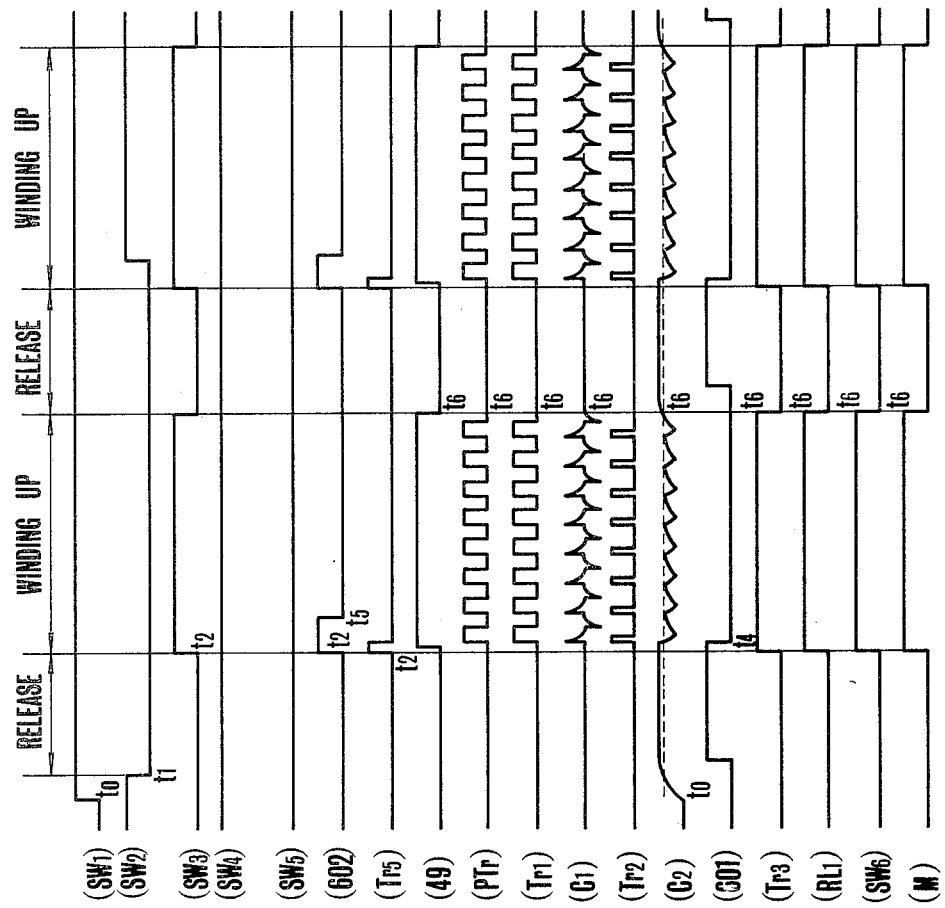
FIGS. 8a to 8r are timing diagrams showing the pulse shapes of circuitry in FIG. 6, when operated in the continuous exposure mode.

As long as the release switch SW2 is depressed, a continuous succession of exposures are taken as shown in FIGS. 8a to 8r. When the release switch SW2 is opened, the camera finishes the last cycle through its winding or film advance operation.

(6) Stopping The Film Advance

In the continuous mode, if the last fresh frame area is not full size, or the film is accidentally arrested, for example, by the cassette, during film advance, then the switch SW3 remains closed. Thus, the relay RL1 attempts to keep the motor M going. However, the sprocket 47 and the plate 309 stop so that light either strikes, or is blocked from the photo-transistor PTr. Because the transistor Tr2 is turned on by the differentiated output of the photo-transistor PTr, stoppage of the plate 309 causes the voltage across the capacitor C2 to increase beyond the threshold level at which the comparator circuit's 601 output rises and turns off the transistor Tr3. This deenergizes the relay RL1 and stops the motor M, thereby automatically interrupting the film advance.

In either the continuous or single frame mode, when the photographer reaches the end of the film in the cartridge during the last cycle of the winding operation, the switch SW2 remains unchanged from the "on" state and the film stops. Therefore, the circular plate does not rotate, permitting voltage across the capacitor C2 to reach the predetermined level at which the output of the comparator 601 changes to the high level. Thus, the transistor Tr3 is turned off to deenergize the relay RL1 so that the switch SW6 is moved from "a" to "b" and the motor M is stopped.

Figure 9:
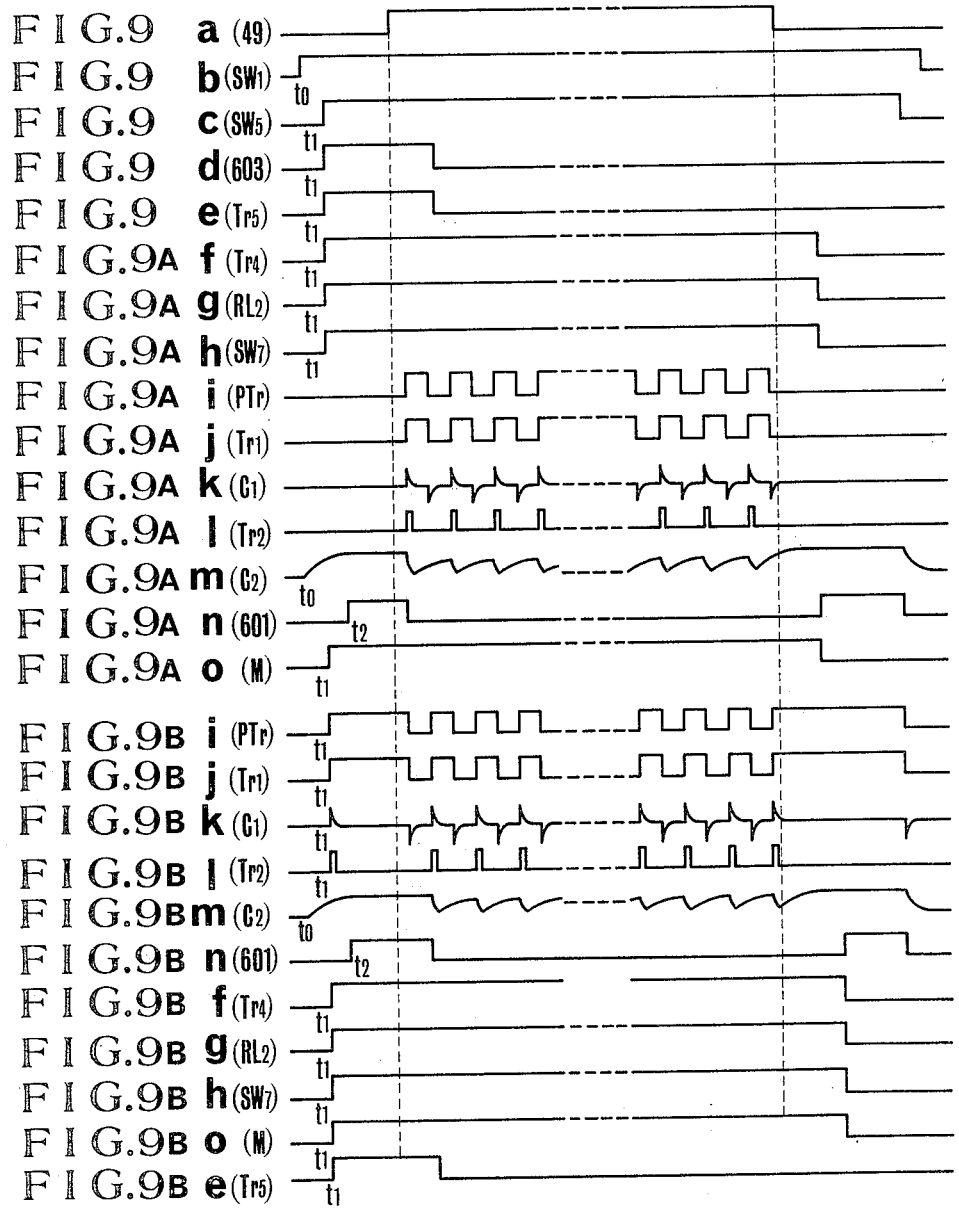
FIGS. 9a to 9Bo are wave form diagrams showing the timing of pulses in the electrical circuitry of FIG. 6, when operated in the rewind mode.

(7) Automatic Rewind Mode (FIGS. 9a to 93, 9Af to 9Ao, 9Bf to 9Bo)

Starting with the switches SW1 to SW7 is the position shown in FIG. 6, the switch SW1 is closed at time $t_0$ in FIG. 9b, and at time $t_1$ in FIG. 9c and the rewind lever 1 is turned counterclockwise. This throws the switch SW5 to the "b" position. As a result, the timer circuit 603 is triggered and the transistor Tr4 enabled. At the time $t_1$ the output of the comparator circuit 601 remains low, as shown in FIG. 9An, and turns on the transistor Tr4. This energizes the relay RL2, and throws the switch SW7 to position "b". The motor M is now rotated in the reverse direction through a circuit which can be traced as P-SW1-SW6a-M-SW7b-P.

During this time, the rewind lever 37 is turned counterclockwise, and as shown in FIG. 5, the sprocket shaft is disengaged and the sprocket 47 becomes freely rotatable. Also, by operating the lever 1, the slide plate 3 is moved to the right by spring 5 against the cam discs 2 and 13. The detent pin 6 is now pushed through the slot of the sleeve 8B and into the spiral groove 7c of the rewind shaft 7. The cam disc 13 causes the levers 14, 15 and 16 and the slide plate 19 to move the gear 23 into engagement with the driven gear 25 of the motor M. Because the motor M rotates in the reverse direction, the rewind shaft 7 is rotated clockwise by the worm gear 9 and the gear 8.

Figure 3:
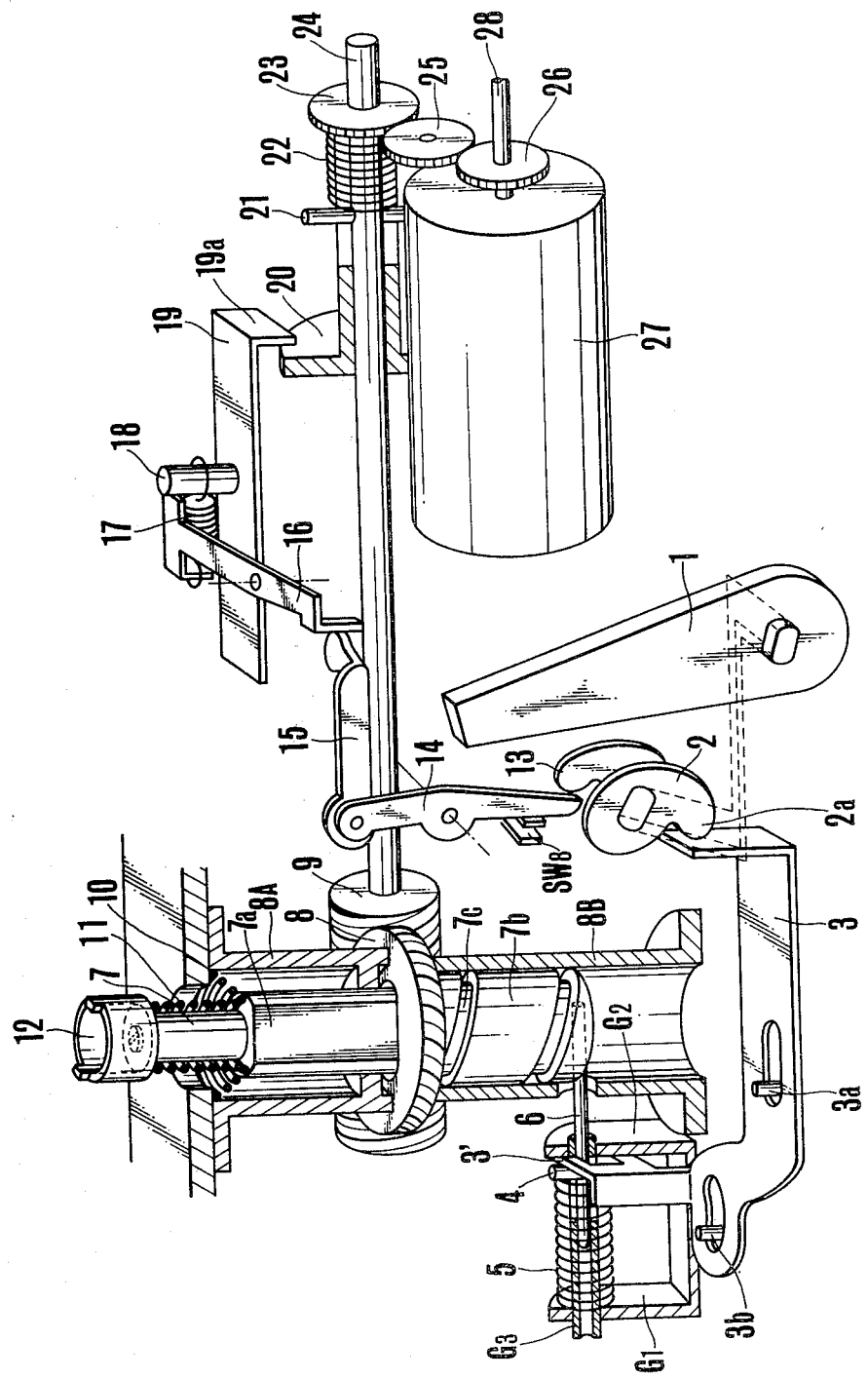
FIG. 3 is a view of the device in FIG. 2 in the rewind mode.

As the shaft 7 rotates, it is lifted by the pin 6 in the spiral groove 7c, against the force of the spring 10, until the rewind coupler 12 engages the hub of the core of the supply spool in the camera body A (See FIG. 3). The shaft 7 keeps moving up until the detent pin 6 reaches the bottom surface of the shaft 7, while the force of the spring 11 causes the spool core 52a of the film cartridge and the rewind coupler 12 to engage each other. Thus, the rewinding torque of shaft 7 is transmitted to the spool core 52a to start rewinding the film.

At this time, the sprocket 48 which is in engagement with the perforations of the film, rotates and causes the photo-transistor PTr to produce a train of signals (FIG. 9i) by virtue of which the transistor Tr2 is rendered intermittently conductive (FIG. 9*l*). As long as the disc 309 rotates, voltage across the capacitor C2 does not reach the critical level, and the output of comparator 601 remains low. This keeps the transistor Tr4 on. Thus, even after the timer 603 terminates its operation, the motor M continues to rotate.

After the leader of the film has passed over the sprocket 47, the rotation of the sprocket 47 ends, and no more "on" signals appear at the transistor Tr2. Hence, after a predetermined time has elapsed, the capacitor C2 inverts the comparator circuit 601 and drives its output low. The transistor Tr4 is now turned off to render the relay RL2 inoperative, and the switch SW7 is returned to position "a" where the motor M is stopped. Rewinding of the film now also stops. Since the time interval between the moment at which the film leader has been taken out of the sprocket and the moment at which the motor M stops, depends upon the timer C2, R4, it is possible to prevent the leader end of the film from entering the cassette by adjusting the time constant of the timer C2, R4.

In one embodiment, it takes eight seconds to rewind a 36-exposure film strip at an average rewind speed of about 200 mm/sec. Since the sprocket has eight teeth, the number of revolutions of the rewind button per second is about 5.6 r.p.s. The number of slits in the circuit detection plate 309 is eight, and the period of pulses to the transistor Tr2 is about 22 milliseconds. The time interval between stopping the rotation of the rewind button and the capacitor C2 reaching its threshold level, may be estimated to be equal to four times the period, that is, about 88 milliseconds. During this time interval, the film leader is moved away from the sprocket by a distance obtained by the following equation: $200 \text{ mm/sec.} \times 88 \text{ msec.} \times 1/1000 = 17.6 \text{ mm}$. Hence, reliable stoppage can be effected before the film is completely pulled into the cassette.

After the motor M has stopped, the operator turns the lever 1 to its initial position, thereby retracting the detent pin 6 from the sleeve 8B. Then, the shaft 7 is automatically lowered by the action of the spring 10, and the gear 23 is disengaged from the gear 22 by the force of the spring 22. FIGS. 9*a*–9*e* and 9A*f* to 9A*o*, and FIGS. 9*a*–9*e* and 9B*f* to 9B*o* show the waveforms for initiation of the rewinding operation with the photo-transistor PTr unexposed and exposed, respectively.

The aforementioned embodiment uses a photo-coupler unit. According to other embodiments of the invention, the same function is accomplished by magnetic detecting means cooperating with the sprocket, or by a member movable with the film.

According to yet another embodiment of the present invention, it is not necessary to establish the rotative relationship between the sprocket and the release button as described. Instead, detection is accomplished by providing the sprocket with, or a rotary member responsive to the film movement with, a magnetic or optical signal source, for example a number of permanent magnets, and detecting the signal source with signal detecting means such as a coil in the rewind device positioned to face the magnets.

As described, the rewind device detects actual movement of the film to stop the rewinding operation automatically. This prevents all of the film leader from being pulled into the cartridge. Even in the film advance mode, when the film is no longer pulled out of the cartridge, or is accidentally entangled, the operation is instantly stopped to prevent any additional damage to the film. When film motion is detected with the sprocket, the present invention can be applied to an existing unmodified available camera.

In the described embodiment, the motor 27 starts to rotate in the reverse direction when the rewind lever 1 is operated, and upon engagement of the gears 23 and 25, the rotating rewind coupler 12 rises until it reaches the cartridge spool core. During this time, the rotational speed of the rewind coupler 12 is capable of reaching a predetermined level despite the degree of inertia of the rewind mechanism. Therefore, upon engagement with the rewind coupler 12, the spool starts to rewind the film in a very short ramp time. Moreover, because the rewind coupler 12 is already rotating before it engages the end surface of the spool core, when the rewind coupler 12 reaches the same phase of rotation as that of the hub of the spool core, it is brought into driving engagement with the hub by the force of the spring 11. For this reason, there is no need to deepen or expand the amount of engagement therebetween by increasing the length of movement of the rewind coupler 12, and it is possible to ensure that a limited degree of engagement will produce a reliable rewinding operation.

This advantage can best be appreciated by considering a rewind coupler which rises but does not rotate at the time of engagement with the spool hub or core. In that case, as soon as the rewind coupler is rotated, the spring acts on the coupler to engage it with the spool hub. If the degree of engagement therebetween is minimal, the coupler pawl tends to slip over the hub during the ramp time of the coupler, so that reliable driving engagement is not established. To avoid this, it is necessary to increase the amount of engagement therebetween.

Figure 10:
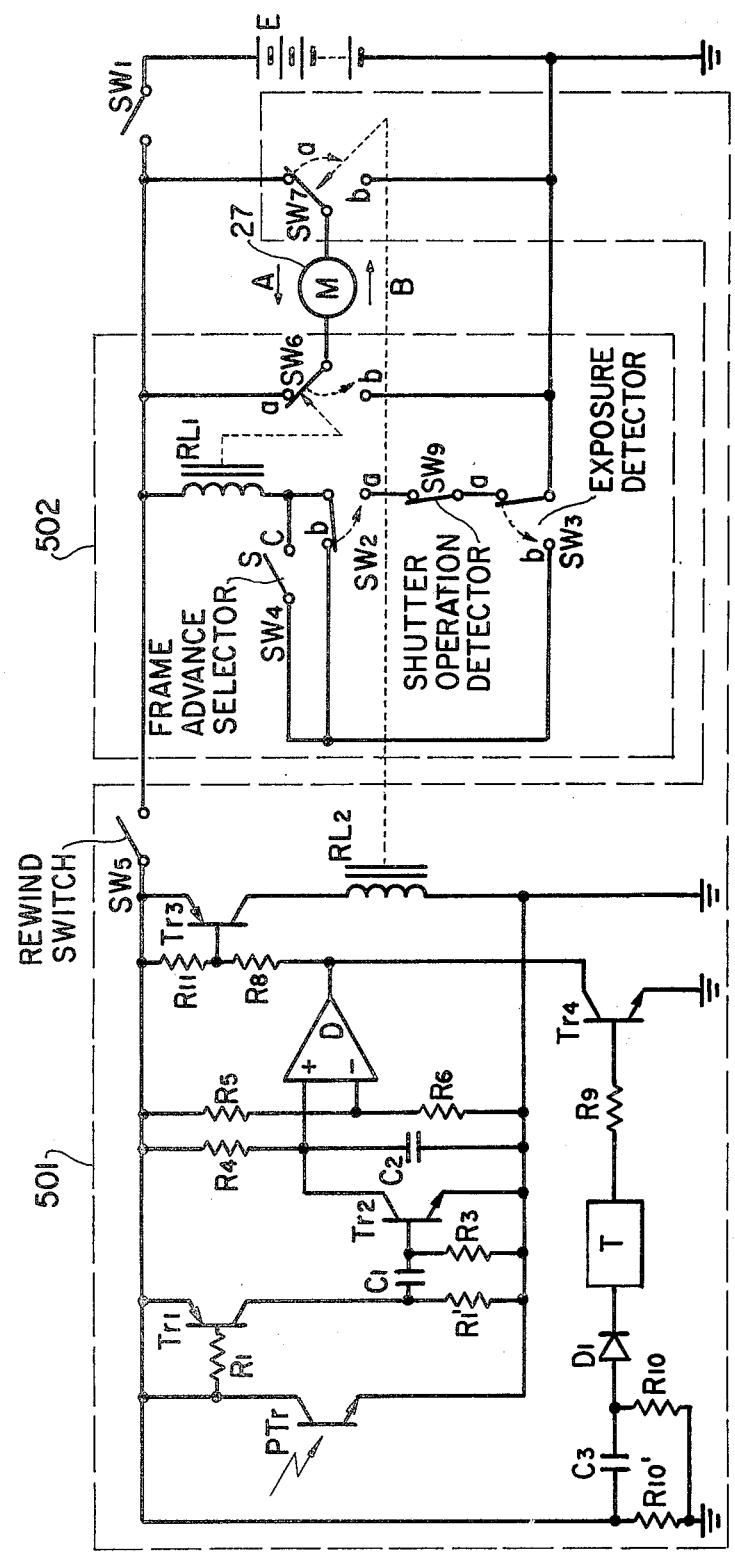
FIGS. 10 and 10a are a circuit diagram of and perspective view of another embodiment of the invention.
Figure 10A:
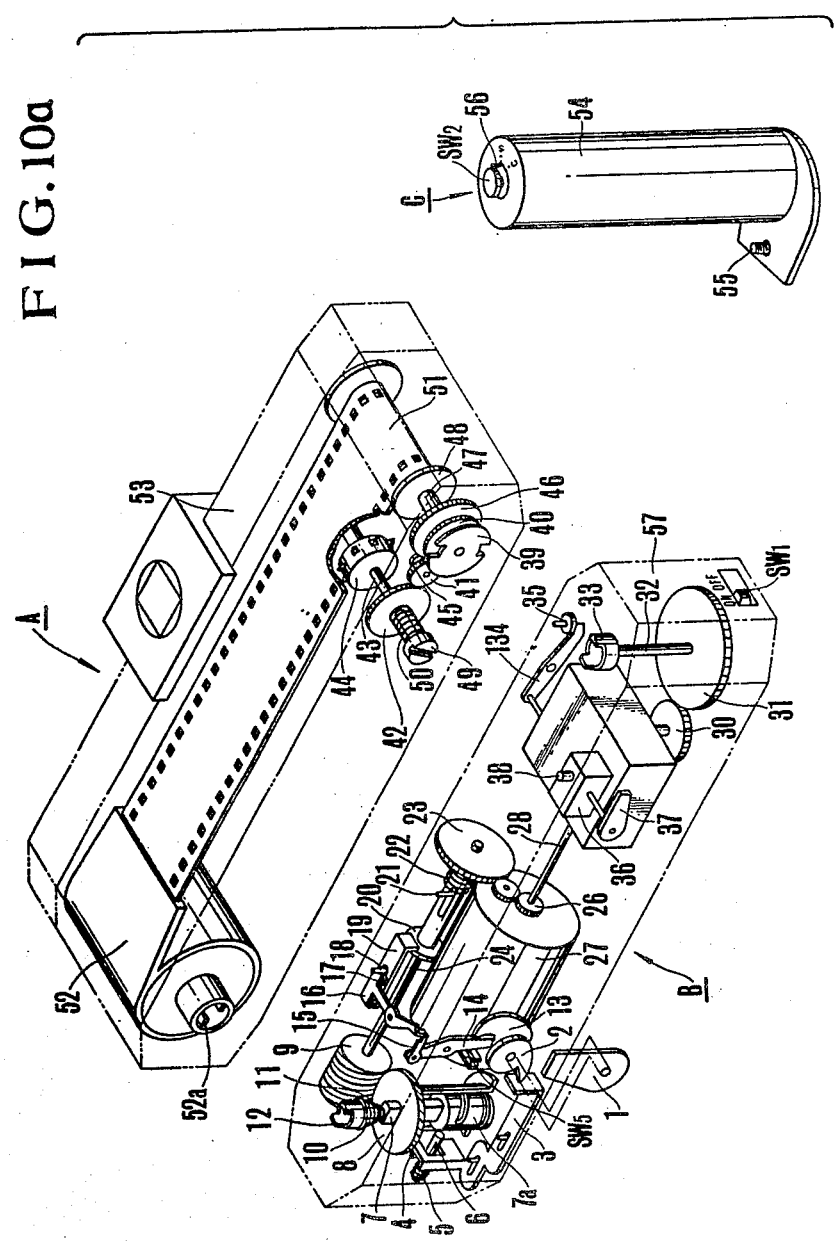

(8) Embodiment of FIGS. 10 and 10*a*

FIG. 10*a* shows another embodiment of the device in FIG. 1 and FIG. 10 shows another example of the control circuit contained in the motor driven winding device B. Here, elements having functions corresponding to those of FIGS. 1 and 6 carry like reference characters. The device B includes an automatic rewind stopping circuit 501; a winding release circuit 502; an electrical power source or battery E arranged in the grip C; a power switch SW1 mounted on the side wall of the casing and actuable for opening and closing operations; and an electric motor M, usable in the rewind mode as well as in the wind mode. In the circuits 501 and 502, two switches SW6 and SW7 cooperate with respective relays RL1 and RL2 either to short-circuit a driving circuit for the motor M, or to form a control circuit for forward or reverse rotation. The circuit 501 includes a photo-transistor arranged in a photo-coupler unit 310; a transistor Tr1 rendered conductive when light strikes the photo-transistor PTr; a capacitor C1 and a resistor R1 forming a differentiation circuit; a resistor R4 and a capacitor C2 forming a timer circuit; a short-circuit forming transistor Tr2 connected parallel to the capacitor C2; voltage division resistors R5 and R6; comparator circuit D; and a rewind switch SW5 which is opened and closed in response to the selector lever 14, and which is normally open but closed when the rewind lever 1 is operated.

In circuit 502, a switch SW3 is set to position "a" when film advance is completed, and to position "b" when an exposure is completed. This switch SW3 may be arranged to cooperate with the shutter mechanism in the camera, and a practical example of construction is disclosed in Japanese Open Patent Sho 52-62015. A release switch SW2 in the grip C is normally set to "b" and changed to "a" to release the shutter. A switch SW9 is arranged to be "off" as long as the camera shutter is released with the mirror flipped upwardly in response to a shutter actuating mechanism; for example, a mirror drive mechanism. A switch SW4 is turned on in response to the mode selector member 56 in the grip C when the continuous exposure mode is selected, and is turned off when the single frame exposure mode is selected. The switches SW2 to SW5 are connected through connectors, not shown, either with the camera body or with the grip.

In circuit 501, a relay drive transistor Tr3 is connected to the relay RL2, with the base of transistor Tr3 being connected to the output of the comparator circuit D through resistors and to a resistor R11. A timer circuit T, preferably in the form of a one-shop circuit, contains an input connected through a diode D1 to the output of a differentiation circuit of a capacitor C3 and a resistor R10, and forms an output connected to the base of a transistor Tr4 through a resistor R9. The timing period of the timer circuit T is equal to a time interval between the moment at which the film is actually moved. Also, the time constant of the timer circuit R4, C2 is pre-adjusted to a time longer than the period of the transistor Tr2, momentarily short-circuiting the capacitor C2 in response to the differentiation circuit when the photo-transistor PTr is turned on and off as the detection disc 309 rotates during the winding and rewinding operations. A rewind mechanism which is used along with the above-described control circuit is the same as that of FIGS. 1 to 5. Therefore, its detailed explanation is omitted. The operation is as follows.

Figure 11:
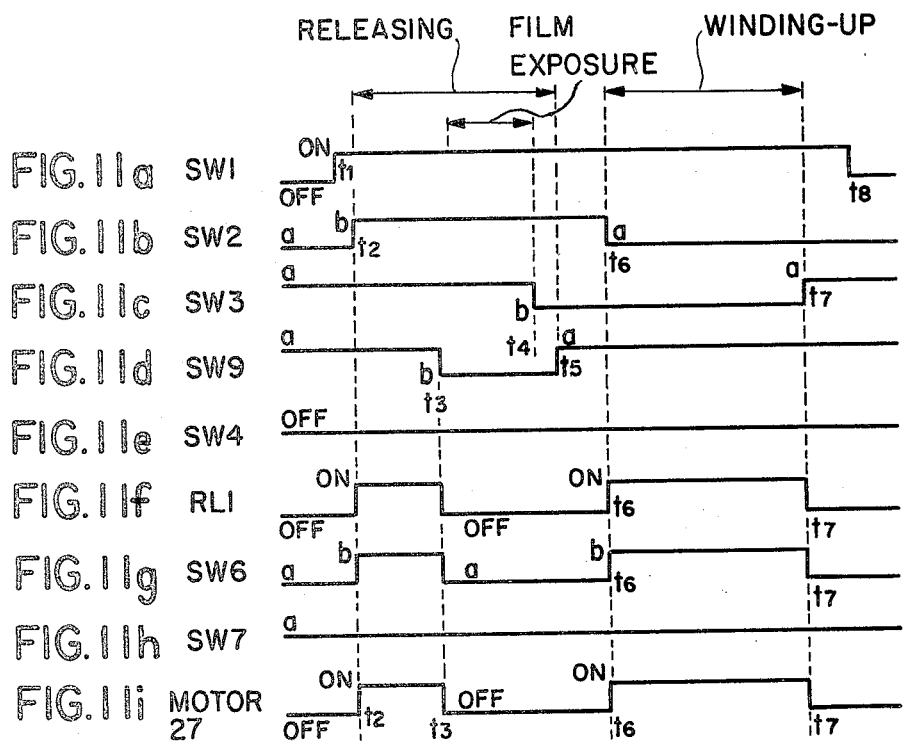
FIGS. 11a to 11h, 12a, to 12h, and 13a to 13Bz are time wave forms illustrating the pulse timing of the electrical circuitry of FIG. 10 in the single frame exposure, continuous exposure and rewind modes, respectively.

(9) Single Frame Operating Mode (FIGS. 10 to 11i)

When the power drive B and the grip C are mounted on the camera body A, the switches assume the positions shown in FIG. 10. Thus, before the power is turned on, the switch SW4 is open, the switch SW2 is biased to "a", the switch SW3 is set by completion of the wind up operation to "a", the switch SW4 is open, the switch SW4 may be in either position but is shown as "S", the switches SW6 and SW7 are normally biased to "a", and the switch SW9 set closed. Setting the mode selector member 56 of the grip C to "S" opens the switch SW4 and places it in the position "S" as shown in FIG. 10. This sets the camera to the single exposure mode. Turning on the power closes the switch SW1 at the time $t_1$ in FIGS. 11a to 11a.

When the switch SW2 in the grip C is depressed at the time $t_2$, its movable contact is switched to "b". Because the switch SW3 is at "a", in response to completion of the last film advance, switching of the switch SW2 energizes the relay RL1 and moves the relay contact at switch SW6 to "b". (See FIGS. 11f and 11g.) Current now flows through the motor M in the direction of the arrow A.

When the output of the motor 27 exceeds the winding torque necessary to overcome locking of the shaft that occured upon completion of the last windup, the motor begins to move. The speed reduction mechanism 29, through a release lever 134, now causes a release pin 35 to release the camera operation. This actuates the mirror, the diaphragm, and the shutter in sequence. When the mirror is raised the switch SW9 turns off and the relay RL1 becomes inoperative. The switch SW6 now changes to the position "a" and the motor is short-circuited and stopped. Even when the release switch SW2 is allowed to return to its normal position at "a", the switch SW6 remains at the position "a" until the switch SW3 responds to completion of the shutter release. This prevents further film advance.

After the appropriate shutter time, the shutter is closed to complete the single frame exposure. This switches the switch SW3 to "b" and actuates the relay RL1 if the release switch has been freed and switched to the position "a". In this way, the motor rotates in the normal direction to advance the film. Because the release has been completed when the film advance is completed, the winding shaft is locked until the next cycle.

The relay RL1 does not operate even if the release switch SW2 is continuously depressed beyond completion of the shutter release or even if the switch SW3 is switched to position "b" by completion of the release. When the switch SW2 is freed, after completion of the release, the relay RL1 is actuated to advance the film.

No film advance occurs during the release operation. If the release switch SW2 has been freed and switched to the position "a" to complete the release, and the switch SW3 has been switched to "b", the film is wound. When the film advance is completed, the switch SW3 is changed to "a" to deenergize the relay RL1. This changes the switch SW6 to the position "a", thereby short-circuiting and stopping the motor.

Because the switch SW5 is kept off for a while, the rewind automatic stopping circuit 501 does not operate. Therefore, each time the release switch SW2 is depressed, the motor 27 rotates to effect an exposure operation following the release operation. When the exposure operation is completed and the release switch SW2 is freed, the winding operation is effected. When the film advance is completed, the motor is stopped.

(10) Continuous Exposure Mode of FIGS. 10 and 10a (Curves of FIGS. 12a to 12i)

Setting the selector member 56 to "c" closes the switch SW4 and selects the continuous exposure mode. Similar to the single frame exposure mode, the depressing of the release switch SW2 causes the motor to rotate forward. When the mirror is raised, the switch SW9 turns off so that the motor stops. When the camera release is completed, the switch SW3 is changed to the position "b". Because the switch SW4 is at "c", the motor 27 rotates in the forward direction to feed the film even if the switch SW2 is continuously depressed. When the film has been advanced one frame, the switch SW3 returns to the position "a" and the relay RL1 is again actuated to effect release.

Figure 12:
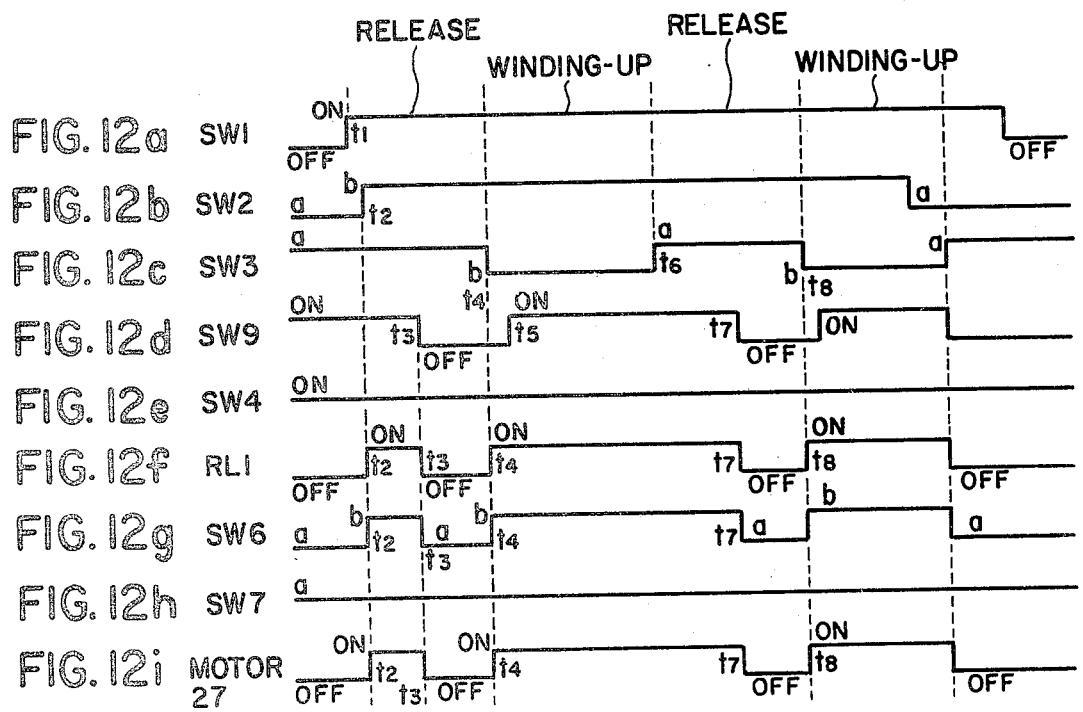

As long as the release switch SW2 is depressed, therefore, a continuous succession of exposures is taken, as shown in FIG. 12. When the release switch SW2 is freed, the switch SW2 changes to the position "a" and stops the motor once the last cycle of the exposure and winding operation has been completed. That is, if the switch SW3 is in the position "a", releasing the switch SW2 to the position "a" deenergizes the relay RL1 and stops the motor. If the switch SW3 is in the position "b" when the switch SW2 is released to the position "a", the switch SW3 will maintain energization of the relay RL1 and operation of the motor until the switch SW3 returns to "a" at the end of the cycle.

Figure 13:
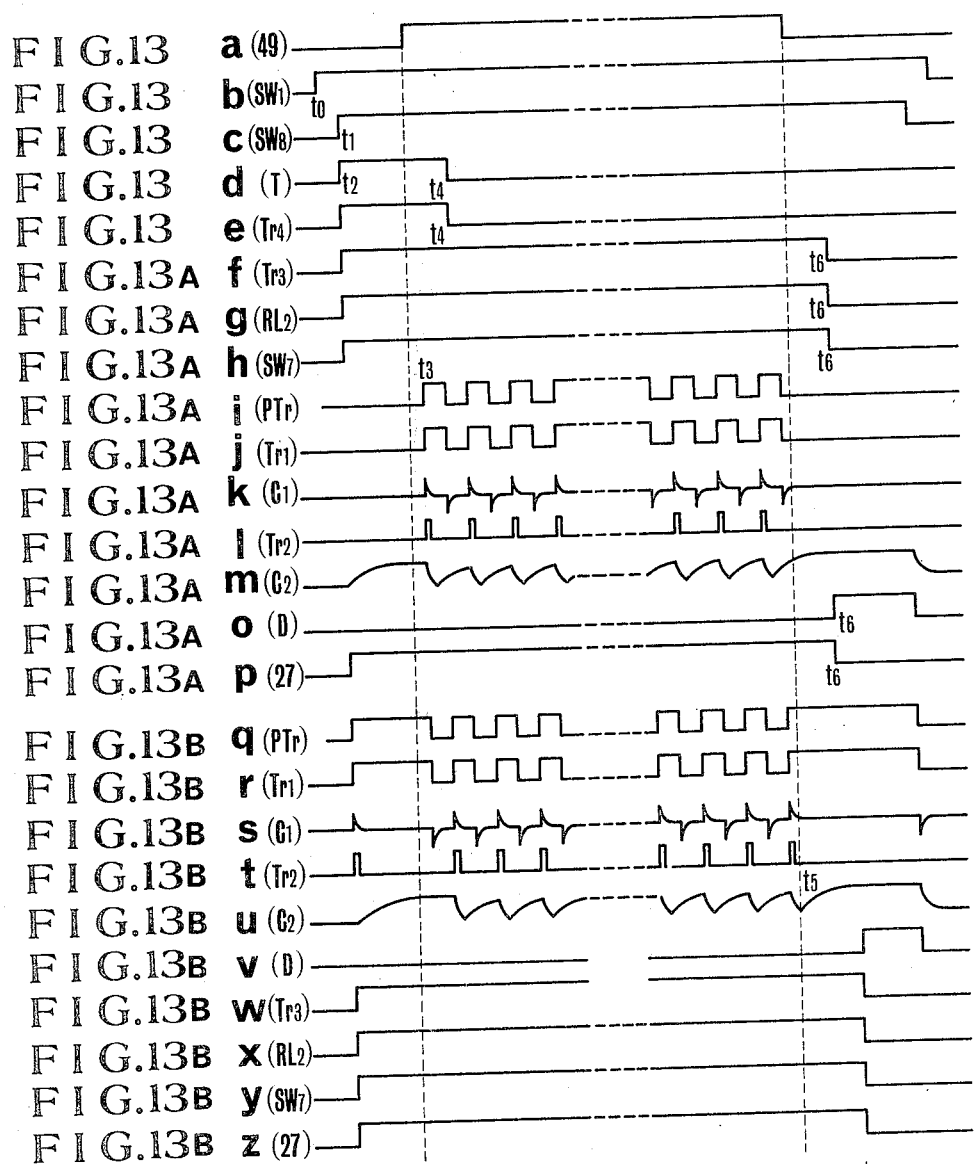

(11) Automatic Rewind Mode of FIG. 10 (FIGS. 13a to 13z)

When the rewind lever 1 is turned counterclockwise, the switch SW8 is turned on. As a result, the timer circuit T of FIG. 10 is triggered by differentiating circuit C3, R10, and R11 through the diode D1. However, because the output of the comparator circuit D remains low, as shown in FIG. 13o, the transistor Tr3 is turned on as shown in FIG. 13f. On the other hand, the transistor Tr4 is turned on in response to triggering of the timer T. As a result, the relay RL2 is energized to switch the contact SW7 to the position "b" and the motor starts to rotate in the reverse direction in reponse to power supplied through a circuit E-SW1-SW6a-27-SW7b-E.

During this time, the rewind lever 37 is actuated to turn in the counterclockwise direction, and, as shown in FIG. 5, the sprocket shaft is disengaged so that the sprocket 48 is now freely rotatable. Operating the lever 1, turns the cam discs 2 and 13 and allows the force of the spring 5 to move the slide plate 3 to the right. As a result, the detent pin 6 is inserted through the slot of the sleeve 8B into the spiral groove 7c of the rewind shaft 7. The cam disc 13 causes the levers 14, 15 and 16 and the slide 19 to engage the gear 23 with the gear 25 driven by the motor 27.

Because the motor 27 rotates in the reverse direction, the rewind shaft 7 rotates clockwise in response to the worm gear 9 and the gear 8. As the shaft 7 rotates, it is lifted upwardly by the spiral groove 7c against the force of the spring 10, until the rewind coupler 12 engages the spool core hub in the camera body A. While the engagement is maintained, the detent pin 6 in the groove 7c reaches the bottom surface of the shaft 7. (See FIG. 3.) Then the spool core 52a of the film cartridge and the rewind coupler 12 are engaged with each other by the force of the spring 11. Thus, the rewinding force of the shaft 7 is transmitted to the spool core 52a to start rewinding the film.

As shown in FIG. 10, after elapse of time from the actuation of the rewind lever 1 to the engagement of the coupler with the cartridge spool core (actually spool core hub), the timer T is inverted to produce an output, which would ordinarily cause the transistor Tr3 to turn off. However, the transistor Tr3 is held "on" by the comparator circuit D which responds to the output of the photo-transistor PTr that is producing a train of signals shown in FIG. 13a as a result of the sprocket 48 being rotated by engagement with the perforations of the film. These signals cause the transistors Tr1 and Tr2 to conduct intermittently, as shown in FIG. 12l. As long as the disc 309 rotates, therefore, the voltage on the capacitor C2 never reaches a critical or threshold level, and the output of the comparator circuit D remains low. Thus, even after the timer T cuts off, the motor 27 continues to rotate.

After the leader end of the film passes over the sprocket 27, the rotation of the sprocket 47 stops and no more "on" signals appear at the transistor Tr2 (time $t_5$), the capacitor C2 inverts the comparator circuit D after a predetermined time has elapsed (time $t_6$). The transistor Tr3 is now turned off to render the relay RL2 inoperative. The switch SW7 is returned to position "a", the motor 27 is stopped, and the film rewind is also stopped. Because the timer interval between the moment $t_5$ at which the film leader has been taken out of the sprocket and the moment $t_6$ at which the motor 27 stops, is determined by the timer C2, R4, it is readily possible to prevent the leader of the film from entering the cartridge by suitable adjustment of the time constant of the timer C2, R4.

Figure 14:
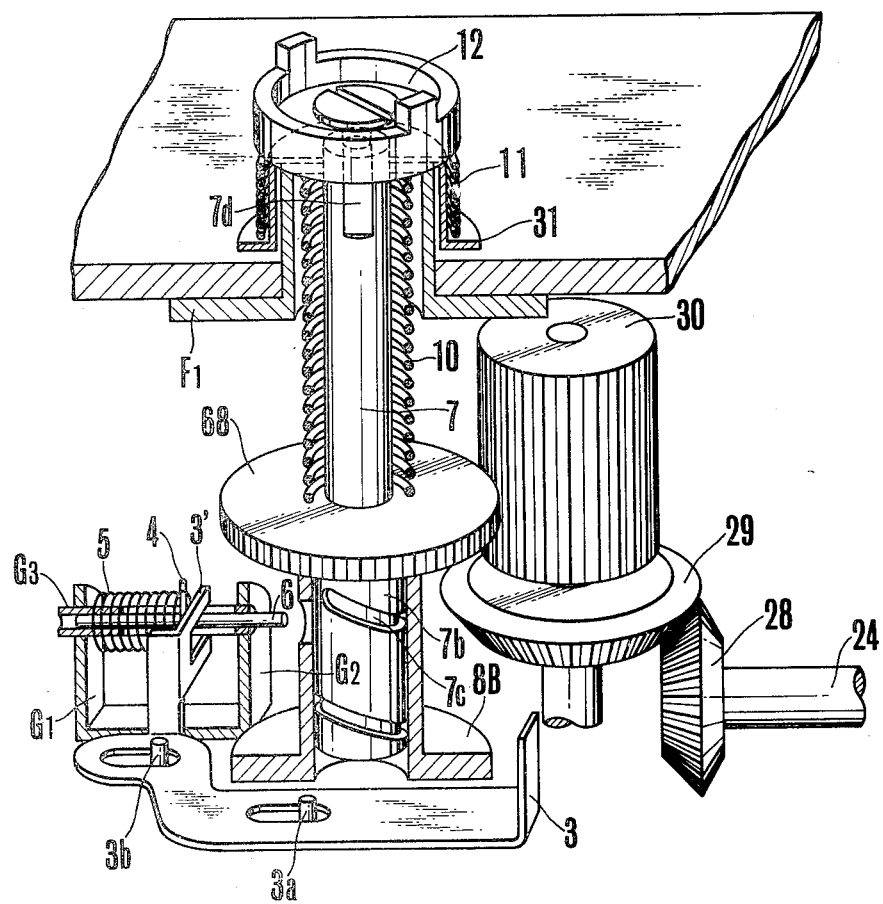
FIG. 14 is a partially perspective view of another embodiment of the rewind device of FIG. 2.
Figure 15:
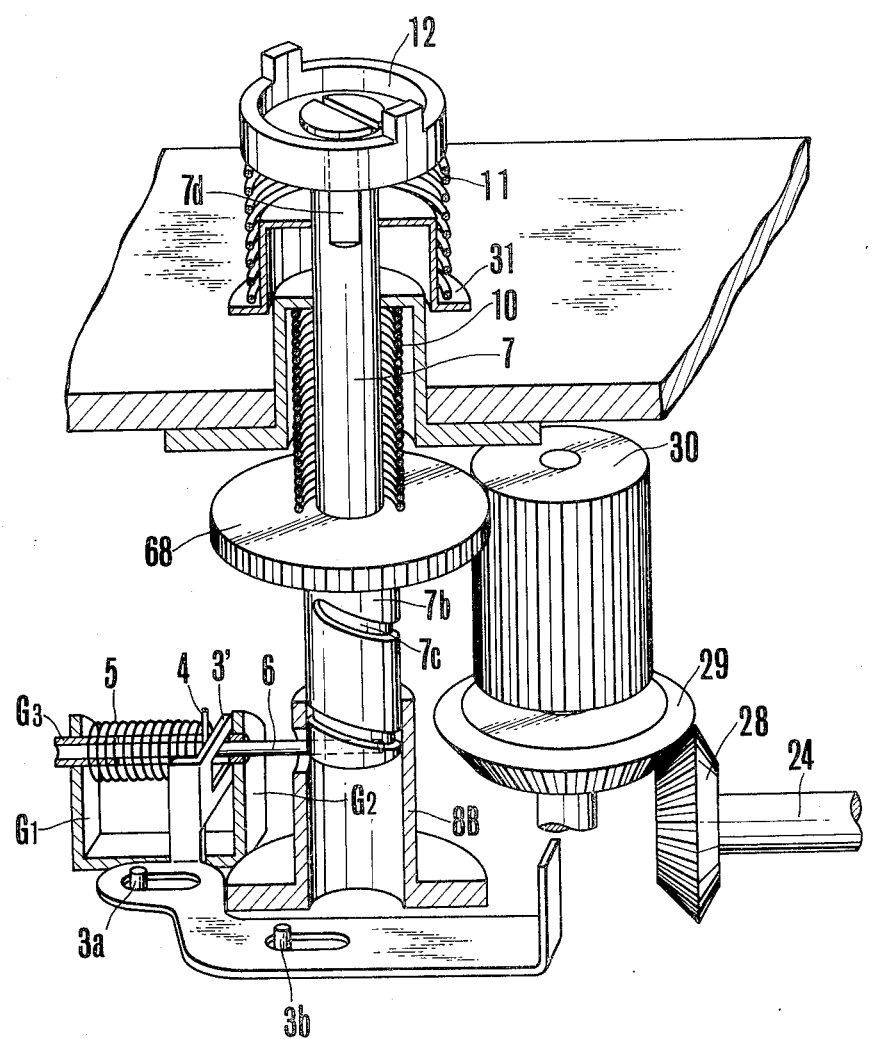
FIG. 15 is a partially perspective view of the apparatus in FIG. 14 in the rewind mode.

FIGS. 14 and 15 show another embodiment of a rewind mechanism. Those parts of the rewind mechanism which are arranged on the motor driving side of the shaft 24 are substantially the same as those in the previous embodiment, and therefore, are not shown. Those of the illustrated parts which correspond to the parts in the previous embodiment are denoted by the same reference characters. In the figures, bevel gear 28 is fixedly mounted on the rear end of the shaft 24, a bevel gear 29 meshes with the gear 28 and, a spur gear 30 is fixedly mounted on the same shaft as the bevel gear 8 in FIGS. 2 and 3, in that the mounting on the rewind shaft 7 is fixed so as to rotate the gear 68 in unison with the shaft 7. In the rewind mode, the pin 6 engages the spiral groove 7c and moves the shaft 7 toward the spool core of the cartridge, against the force of the spring 10, as in the above-described embodiment. Guide member F1 provided with a guide opening portion for the rewind shaft 7 is fixed in an opening of a frame. The rewind coupler 12 on the top end of the shaft 7 is secured thereto by a fastener member 7d between the screw head portion and a two-sided shaft thereof. Since the bottom end of the fastener member 7d is fixedly mounted on the top end of the rewind shaft 7, the rewind coupler 12 rotates in unison therewith. A spring receptor member 31 receives the absorption spring 11, which is connected between the lower skirt of the spring receptor member 31 and the lower surface of the rewind coupler 12. With the mechanism of such construction, when in the rewind mode, the rewind shaft 7 is lifted while being rotated, as the spiral groove 7c rotates through the gears 30 and 8. The gear 8 moves along the geared portion of the spur gear 30, so that even when the rewind coupler 12 engages the cartridge spool core, motion transmission is maintained.

The amount of displacement of the rewind shaft 7 is determined by the lift of the spiral groove, and therefore, the spur gear 30 is designed to have a gear length almost equal to the lift. Thus, when the engagement position is attained, the spiral groove and the spur gear are parallel to each other. As a result, the axial length of the rewind shaft can be shortened, provided that the displacement of the rewind shaft is assured within the geared portion of the gear of the spur gear. This makes it possible to construct the rewind mechanism in a compact form.

By making the spring 10 stronger than the spring 11, when the rewind coupler 12 is moved down, the spring 11 is compressed by the force of the spring 10, while the coupler 12 is depressed by the screw head portion of the fastener member 7d. Thus, even when the rewind is in use, the vertical size can be minimized.

As described, in the rewinding operation of the present invention, the rewind shaft is automatically displaced toward engagement with the spool core of the cartridge while being simultaneously rotated. Since a predetermined rewind speed can be attained just after the engagement, it is possible to shorten the rewind time to speed up the rewinding process. Moreover, by utilizing the inertia of the rewind mechanism, no shock is applied to the drive source such as the motor at the time of engagement. Hence, the invention avoids unnecessary power loss.

Further, the above-described rewind device insures that the rewind shaft and the cartridge spool core are engaged with each other in a phase that establishes reliable engagement. This makes it possible to reduce the amount of engagement and decrease the axial size of the rewind shaft.

The rewind device is, therefore, one that is compact and capable of high speed rewinding.

It is noted that in cases where the spur gear is utilized as part of the rewind mechanism, the compactness of the rewind device can be further facilitated. Such a rewind device is particuarly suitable for use in a small sized camera.

The invention shortens the film rewind while maintaining reliable operation, high performance and compact size.

While embodiments of the invention have been described in detail, it will be obvious to those skilled in the art that the invention may be embodied otherwise without departing from its spirit and scope.

We claim:

1. For a camera having:
film transport means for transporting film and including measuring feed means for engaging the film and feeding the film along a transport path a predetermined distance at successive winding movements and film winding means for winding the film;
release means for permitting a rewind operation and allowing said feed means to move freely, said release means including a movable member movable in association with said feed means;
an automatic film moving device, comprising:
   (a) a drive source;
   (b) film rewinding means operatively connected to said drive source for applying a rewinding force to the film;
   (c) detecting means for engaging said movable member and detecting movement of the movable member by the film when the film is rewound, said detecting means being arranged to detect that said movable member has stopped when the film moves to disengage from said feed means;
   (d) a control circuit functionally connected to said detecting means and the drive source for controlling said drive source and automatically stopping the drive source when the film is retracted from the predetermined position in the film running path.

2. A device according to claim 1, wherein said film transport means to operatively coupled with said drive source; and said feed means includes a sprocket arranged to engage a part of the film.

3. A device according to claim 2, wherein:
said detecting means includes rotary means rotating in engagement with said movable member for converting the rotation of said rotary means into an electrical pulse signal; and
said detecting means further including a resettable timer circuit responsive to said pulse signal to be reset.

4. A device according to claim 1, wherein
said rewinding means includes a film rewinder; and
film rewind operating means operatively connected to said film rewinder to thereby connect said rewinder to said drive source, said rewinding means having control means for rendering said detecting means operative.

5. A device according to claim 4, wherein
said film rewinding means further includes engaging means engageable with a film spool core; and
displacing means coupled to the engaging means and said operating means for displacing said engaging means to a spool engagement position in response to said operating means, said displacing means being arranged to be in driven relation to said drive source and to automatically effect said displacement in response to the operation of said operating means.

6. A film automatic drive device for use with a camera having a chamber in which film is loaded and film convoluting means within the chamber including:
   (a) a drive source;
   (b) a rewind device drivingly connectable to said drive source, said device having:
      (1) engaging means engageable with said convoluting means; and
      (2) displacing means operatively connected to said engaging means to displace said engaging means toward engagement with said convoluting means, said displacing means being couplable to the drive source so that the drive torque from said drive source may be transmitted to said displacing means;
   said displacing means comprising securing means for retaining the engaged condition of said engaging means with said convoluting means throughout the entire time of rewinding the film;
   said engaging means being rotatable in a rewind direction by said displaceable means and simultaneously displaceable in the engagement direction to engage said convoluting means for rewinding the film.

7. A device according to claim 6, wherein said displacing means further includes:
rotary means rotatable by said drive source with said engaging means, and
spiral means for rotation with said engaging means,
said securing means having detent means engageable with said spiral means when in the rewind mode and upon rotation of said rotary means to displace said engaging means in the engagement direction.

8. A device according to claim 6, further comprising:
a drive mechanism drivingly connectable to said drive source for coupling the drive source to said displacing means,
said displacing means having a displacing portion,
said mechanism having:
   a drive portion drivingly connected to said displacing portion for moving the displacing portion in the engagement direction of the engaging means,
   said engagement direction of the engaging means being the direction in which said engaging means is displaced to engage with the convoluting means in the camera.

9. A device according to claim 6, further comprising:
a drive mechanism drivingly connectable to said drive source for coupling the drive source to the displacing means,
said displacing means including a displacing portion, and
said drive mechanism having:
   a first gear fixed to said displacing portion; and
   a second gear meshing with said first gear and having a geared portion of a longitudinal length equal to at least the amount of displacement of said displacing portion;
   said first and second gears having toothed portions respectively in parallel with the displacing direction of said displacing portion.

10. A device according to claim 8, further comprising rewind operating means,
said means cooperating with at least a portion of said drive mechanism to cause connection of said mechanism with said drive source when in the rewind mode, and said operating means being further drivingly connectable to said displacing means upon selection of the rewind mode to render said displacing means effective.

11. A device according to claim 6, wherein the camera includes a sprocket and a rewind operating member rotatable in unison with the sprocket during the rewinding operation, the rewinding operation member being arranged to cause free rotation of the sprocket in response to actuation from outside the camera and further comprising:
  detecting means for detecting whether or not the sprocket of the camera rotates; and
  a control circuit connected to said drive source to apply driving energy to the drive source when the sprocket is rotated as detected by said detecting means.

12. An automatic drive device for use in a camera having a chamber in which film is loaded, means for convoluting the film within the chamber, winding means for winding the film a predetermined amount, and actuable means operable from without the camera and operatively coupled with said winding means for permitting rewinding of the film and for rotation while the film is rewound, comprising:
(A) an electric motor;
(B) a rewind mechanism drivingly connectable to said electric motor, and having:
  (a) engaging means engageable with a portion of said convoluting means;
  (b) displacing means for displacing said engaging means in a direction for engagement, said displacing means being limited in its displacing movement by engagement; and
  (c) rewind mode selector means, for producing a connection between said motor and rewind mechanism when in the rewind mode;
(C) a control device for said motor having:
  (d) detecting means having an engageable member which is engageable with said means operable from outside the camera for detecting the rewinding movement of the film through said actuable means; and
  (e) a control circuit connected to said detecting means for controlling stoppage of rotation of said motor, said circuit causing the motor to be rotated or stopped depending upon whether or not the detecting means detects movement of the film, said control circuit having a motion allowing circuit, said circuit when in the rewind mode causing forcible rotation of the motor, and engagement of said engaging means responding to operation of said displacing means.

13. A device according to claim 12, wherein
said motion allowing circuit has a timer circuit, said timer circuit keeping said control circuit and the motor energized for a predetermined time at least until the completion of engaging operation by said engaging means.

14. A device according to claim 12, wherein
said detecting means includes pulse signal forming means; and
said control circuit includes a timer circuit which is reset by the pulse signal formed by said pulse signal forming means, said timer circuit having a constant timer time, said timer time having a longer time than the period of said pulse signal formed when in the film rewind mode.

15. An automatic film drive device for use with a camera having a chamber in which film is loaded and film convoluting means within the chamber, comprising:
(a) drive source means;
(b) a rewind device drivingly connectable to said drive source means, said device having:
  (1) engaging means displaceable relative to the convoluting means for engagement with said convoluting means;
  (2) displacing means operatively connected to said engaging means to displace and rotate said engaging means into the film rewinding direction during its engagement movement toward said convoluting means, said displacing means having rotatable means couplable to the drive source, and said engaging means;
  (3) said engaging means being displaceable toward engagement with said convoluting means by rotation thereof in cooperation with said displacing means.

16. A drive device according to claim 15, wherein
(1) said engaging means includes spiral means and an engaging portion to be engageable with said film convoluting means, the spiral means being rotatably and radially movable together with the engaging portion;
(2) said displacing means further comprising detent means engageable with the spiral means for displacing said engaging means, the detent means being engaged with the spiral means during the engaging displacement of said engaging means and being engageable with one portion of said engaging means for holding the engaging means in engaging relation with said film convoluting means after engagement has been completed.

17. A drive device according to claim 16, wherein
said displacing means further comprises rotatable drive gear means couplable to said drive source, the gear means having a central opening through which said engaging means is rotatably fixed and radially displaceable.

18. A drive device according to claim 16, wherein
said engaging means further comprises driven gear means having a first gear portion;
said drive source means further comprising drive gear means having a second gear portion, the length of the second gear portion at least corresponding to displacement of said engaging means so that displacement of said engaging means is permitted by sliding the first gear portion of said driven gear means on the second gear portion of said drive gear means without relative rotation of said drive gear means and said driven gear means.

* * * * *